(12) United States Patent
Simms et al.

(10) Patent No.: US 11,488,080 B1
(45) Date of Patent: Nov. 1, 2022

(54) DATA DRIVEN RESOURCE ALLOCATION USER INTERFACE

(71) Applicant: Wells Fargo Bank, N.A., San Francisco, CA (US)

(72) Inventors: Gary Simms, Manassas, VA (US); Matthew Stenvall Shejen, Charlotte, NC (US); Benjamin-Josiah Robert Huff, Richmond, VA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 36 days.

(21) Appl. No.: 16/721,859

(22) Filed: Dec. 19, 2019

(51) Int. Cl.
- *G06Q 10/06* (2012.01)
- *G06F 16/21* (2019.01)
- *G06F 9/451* (2018.01)

(52) U.S. Cl.
CPC ....... *G06Q 10/06312* (2013.01); *G06F 9/451* (2018.02); *G06F 16/211* (2019.01)

(58) Field of Classification Search
None
See application file for complete search history.

(56) References Cited

U.S. PATENT DOCUMENTS

| | | | |
|---|---|---|---|
| 8,311,863 B1 | 11/2012 | Kemp | |
| 10,049,335 B1 | 8/2018 | Narkier et al. | |
| 10,754,946 B1 * | 8/2020 | Gribelyuk | G06F 21/552 |
| 2005/0203784 A1 * | 9/2005 | Rackham | G06Q 10/063 |
| | | | 705/7.11 |
| 2005/0246215 A1 * | 11/2005 | Rackham | G06Q 10/063 |
| | | | 705/7.11 |
| 2007/0027701 A1 | 2/2007 | Cohn et al. | |
| 2007/0156478 A1 | 7/2007 | Breene et al. | |
| 2009/0192867 A1 | 7/2009 | Farooq et al. | |
| 2010/0318395 A1 | 12/2010 | Corneil et al. | |

(Continued)

FOREIGN PATENT DOCUMENTS

| | | | | |
|---|---|---|---|---|
| EP | 1524612 A2 * | 4/2005 | | G06F 19/26 |

OTHER PUBLICATIONS

Michael Behrisch, GUIRO: User-Guided Matrix Reordering, Jan. 2020, IEEE Transactions on Visualization and Computer Graphics, vol. 26, No. 1 (Year: 2020).*

(Continued)

*Primary Examiner* — Jerry O'Connor
*Assistant Examiner* — Matthew H Divelbiss
(74) *Attorney, Agent, or Firm* — Schwegman Lundberg & Woessner, P.A.

(57) ABSTRACT

A method may include retrieving from a data store default values of intersections of a first type of characteristic of an entity and a second type of characteristics of the entity; presenting a first portion of a user interface on an electronic display device, the first portion of the user interface including an initial matrix of: a plurality of rows, a plurality of columns, wherein, the rows columns intersect to form a plurality of cells and the cells are populated with values based on the retrieved default values. The method may further include receiving a maturity value; calculating a weighted matrix of values based on the received maturity values; applying the weighted matrix to the values of the cells in the initial matrix to generate adjusted values for each of the cells in the initial matrix; and presenting an adjusted matrix based on the adjusted values.

17 Claims, 7 Drawing Sheets

(56) References Cited

U.S. PATENT DOCUMENTS

| | | | |
|---|---|---|---|
| 2011/0196719 A1* | 8/2011 | Bhandari | G06Q 10/06393 715/764 |
| 2012/0101872 A1* | 4/2012 | Iyengar | G06Q 10/06393 705/7.39 |
| 2012/0116848 A1 | 5/2012 | Gargiulo et al. | |
| 2013/0204796 A1 | 8/2013 | Desai | |
| 2014/0324521 A1* | 10/2014 | Mun | G06Q 30/0201 705/7.28 |
| 2016/0260037 A1 | 9/2016 | Kumar et al. | |

OTHER PUBLICATIONS

"Assessing Organizational Capabilities: Reviewing and Guiding the Development of Maturity Grids", IEEE Transactions on Engineering Management, vol. 59, No. 1, 138-159, (Feb. 2012), 22 pgs.

Looy, Amy Van, et al., "Evaluating Business Process Maturity Models", Journal of the Association for Information Systems; Atlanta vol. 18, Iss. 6, 461-486, (Jun. 2017), 26 pgs.

\* cited by examiner

DATA DRIVEN RESOURCE ALLOCATION USER INTERFACE

BACKGROUND

Efficient allocation of resources (e.g., people, money, computing) is a problem that entities large and small struggle with. For example, a company may feel like it needs to better define key performance indicators (KPIs) in certain areas or have a better developed long-term strategy. Often this feeling is not backed up by data. Even if data is available to help make these decisions, there may be no model that is available to put the data into context. This may lead to inefficient allocation of resources which may result in wasted time, computing resources, etc.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an Application Programming Interface (API) or other program communication method. Similarly, the variables may be assumed to have default values should a specific value not be described. User interfaces may be provided for an end-user or administrator to edit the variable values in various examples.

There are a number of difficulties that arise when an entity (e.g., a company, partnership, etc.) tries to forecast where best to use their limited resources (e.g., hardware resources, time, etc.) to improve the entity. For example, a company may put resources into innovation or reducing risk. A number of factors may contribute to the ultimate decision of where to allocate the limited number of resources a company has for improvement. For example, each company may have different levels of competencies. Accordingly, what may make sense for one company—e.g., putting resources in one area—may not make sense for another. For example, each company may be at different levels of maturity with their capabilities. It may not be an efficient use of resources to invest in an already mature area where further improvement may require a large investment of resources.

Existing planning tools (software-based or otherwise) are deficient with respect to leveraging data to determine where to focus an entity's resources in order to maximize the allocation of resources for the entity. Described herein is an interactive user interface tool that helps guide a user to finding those areas to focus the limited resources available to an entity. The tool provides a number of improvements over existing planning tools by presenting data in a way that allows a user to quickly see the most resource efficient areas for improvement. Furthermore, the tool is dynamic such that a change in one portion of the tool will automatically update another portion. The described tool also uses different formatting to highlight certain areas that may be especially prudent for further investment. Using the tool may reduce the chance of inefficient or wasted resources providing a technical improvement when compared to other resource planning tools.

The GUI tool framework generally helps a user focus strategic competencies (market, strategy, execution, and measurement) of an entity in relationship to capabilities of the entity. Additionally, the tool helps a user know mature an entity is with respect to each of the capabilities/competencies to make the right resources allocation. More detailed descriptions of the tool are provided herein.

Figure 1:
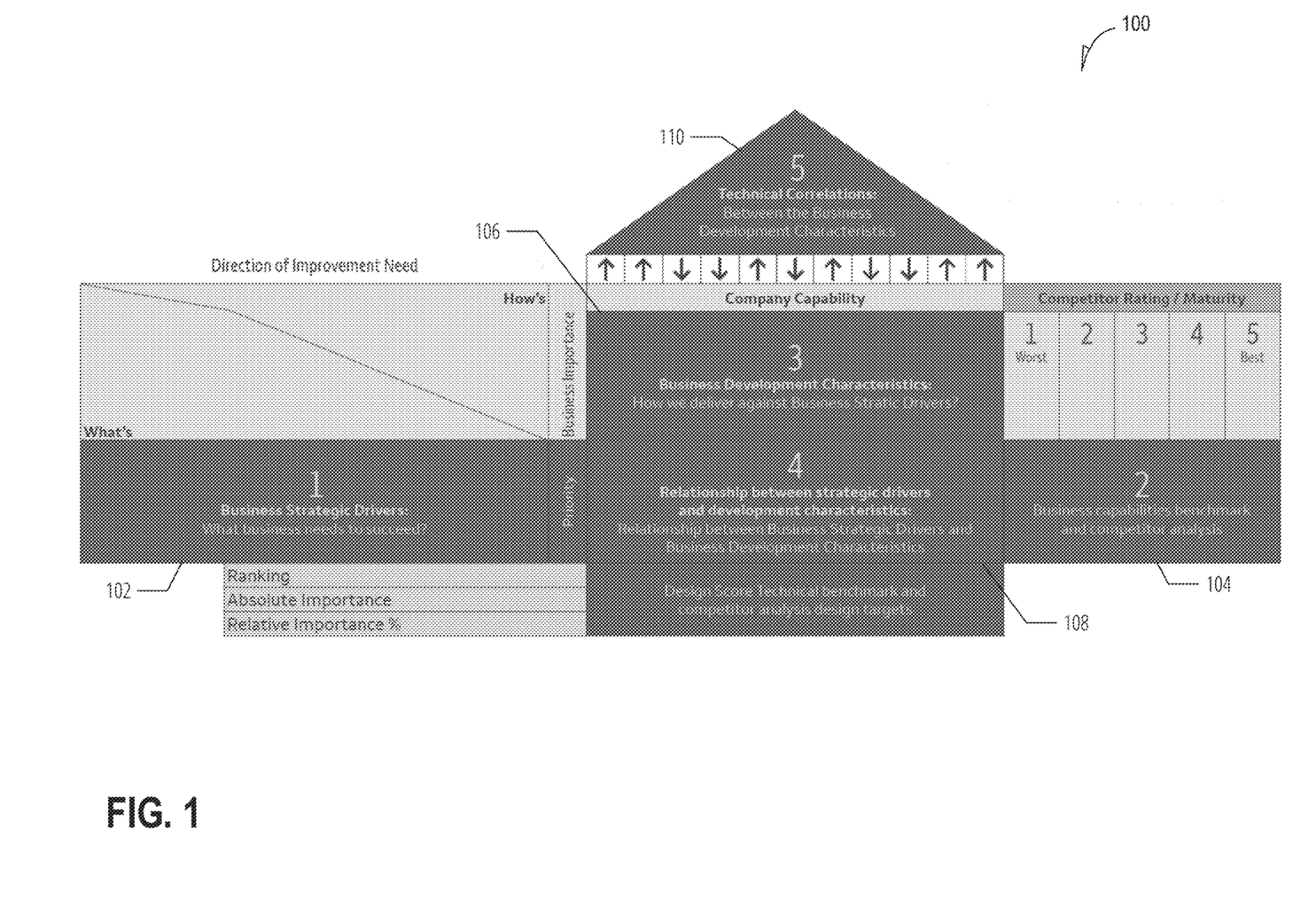
FIG. 1 is a diagram illustrating an overview of portions of a graphical user interface (GUI) planning tool, according to various examples.

FIG. 1 is a diagram illustrating an overview of portions of a graphical user interface (GUI) planning tool 100, according to various examples. FIG. 1 includes strategic drivers 102, competitor benchmarks 104, entity capabilities 106, relationships 108, and correlations 110. GUI planning tool may be part of an existing application, a stand-alone application, or a web application, according to various examples.

Strategic drivers 102 may represent a set of common characteristics that an entity has with respect to where an entity may want to invest resources into to succeed. For example, strategic drivers 102 may include: market intelligence (e.g., company data, customer intelligence, competitor intelligence); strategy (short-term and long-term; execution (e.g., strategic roadmap and planning; realized value/delivery); and measurements (e.g., clear key performance indicators and key risk indicators; productivity and capacity; and organizational alignment and accountability). Each strategic driver may be presented in a row in various examples. A different set of strategic drivers may be used without departing from the scope of this disclosure.

A user may use competitor benchmarks 104 to identify the relative strengths/weaknesses of themselves compared to their competition. For example, there may be five columns labeled 1-5 (e.g., five being the strongest). Consider that the entity has a competitor, Acme. An 'A' may be placed at the intersection of one of the five columns and a row of strategic drivers 102 signifying the strength of Acme for that specific driver. Different symbols/characters may be used for different competitors. Competitor benchmarks 104 may provide another factor to consider when deciding where to invest resources.

Entity capabilities 106 may be a set of columns that represent company capabilities. The capabilities may include insights & analytics, disruptive innovation, incremental innovation, people, culture & communications, process maturity, technology maturity, risk, cost, customer satisfaction, and quality. A different set of capabilities may be used without departing from the scope of this disclosure.

Relationships 108 may represent a set of correlations between strategic drivers 102 and entity capabilities 106. Different values may be placed at the intersections between strategic drivers 102 and entity capabilities 106. The values may represent the idealized correlation with respect to that entity. Accordingly, the value may be what the entity is striving for rather than where the entity is now.

In various examples, a strong correlation may be given a nine (9) value, a medium correlation a three (3), a weak correlation a one (1), and no correlation a zero (0). In various examples, a set of default values for the relationships 108 may be used. In various examples, more or fewer values may be used for the correlation (e.g., a five-point scale, a three-point scale, etc.).

Correlations 110 may represent a set of technical correlations between entity capabilities 106 themselves. For example, there may be a strong positive correlation between the "people" capability and the "insights & analytics" capability. Different symbols/characters may be used to represent the different correlations (e.g., strong positive correlation, weak positive correlation, no correlation, weak negative correlation, and strong negative correlation). Correlations 110 may help determine who needs to be involved in a decision-making process, who needs to be aware of the decision, etc. Correlations 110 may be used as a guide when determining where to invest resources because a positive effect in one capability may have a negative effect in another capability.

Additionally, the correlations may be used to find the right personnel to improve the capability. For example, if there is a strong correlation between "insight and analytics" and "disruptive innovations" the entity may wish to use personnel associated with both of these capabilities.

Figure 2:
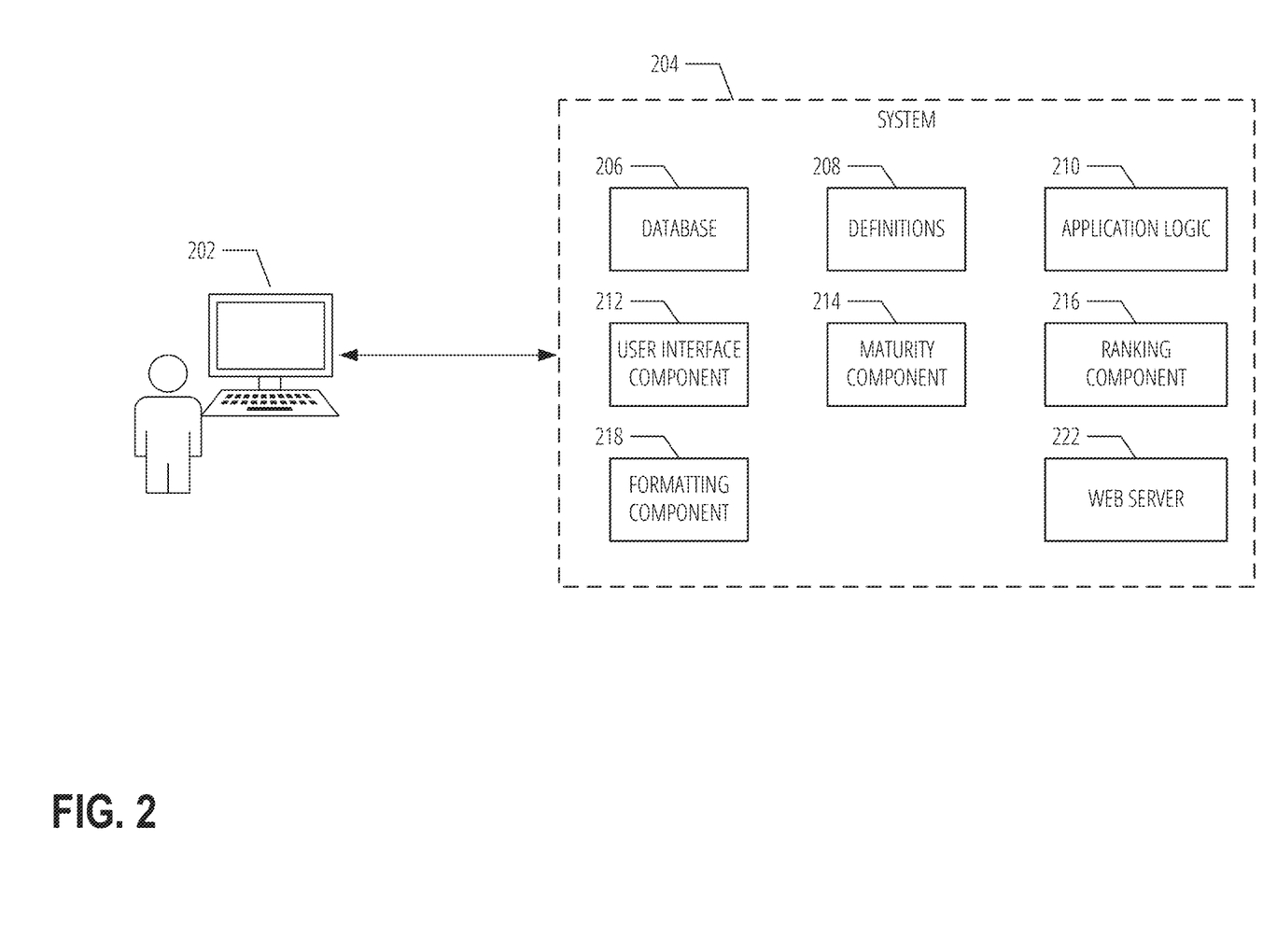
FIG. 2 is a schematic diagram of components associated with a GUI planning tool, according to various examples.

FIG. 2 is a schematic diagram of components associated with a GUI planning tool, according to various examples. FIG. 2 includes user device 202 and system 204. System 204 includes database 206, definitions 208, application logic 210, user interface component 212, maturity component 214, ranking component 216, formatting component 218, and web server 222.

For illustration purposes, system 204 is illustrated as set of separate functional units: database 206, definitions 208, application logic 210, user interface component 212, maturity component 214, ranking component 216, formatting component 218 and web server 222. However, the functionality of multiple functional units may be performed by a single unit. A functional unit may represent computer program code that is executable by a processing unit (e.g., a core of a general-purpose computer processor, a graphical processing unit, an application specific integrated circuit, etc.). The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

In various examples, application logic 210 is used to present a GUI planning tool on user device 202. Application logic 210 may be used in the context of a web or non-web-based application. Application logic 210 may call one or more of user interface component 212 (e.g., to update and present graphical elements), maturity component 214, ranking component 216, and formatting component 218 while presenting the GUI planning tool as described further herein.

Data used in the system 202 may be organized and stored in a variety of manners. For convenience, the organized collection of data is described herein as database 206. The specific storage layout and model used in database 206 may take a number of forms-indeed, database 206 may utilize multiple models. The database 206 may be, but is not limited to, a relational database (e.g., SQL), non-relational database (NoSQL) a flat file database, object model, document details model, graph database, shared ledger (e.g., blockchain), or a file system hierarchy. Database 206 may store data on one or more storage devices (e.g., a hard disk, random access memory (RAM), etc.). The storage devices may be in standalone arrays, part of one or more servers, and may be located in one or more geographic areas.

User device 202 may be, but is not limited to, a smartphone, tablet, laptop, multi-processor system, microprocessor-based or programmable consumer electronics, game console, set-top box, or any other device that a user utilizes to communicate over a network (not shown). In various examples, user device 202 include a display module (not shown) to display information (e.g., in the form of specially configured user interfaces, such as a GUI planning tool). In some embodiments, user device 202 may include one or more of a touch screen, camera, keyboard, microphone, and Global Positioning System (GPS) device.

In various examples, user device 202 and system 204 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet. In some examples, system 204 and user device 202 are the same device.

Web server 222 may be used to exchange information between user device 202 and system 204 via a network. Although generally discussed in the context of delivering webpages via the Hypertext Transfer Protocol (HTTP), other network protocols may be utilized by web server 222 (e.g., File Transfer Protocol, Telnet, Secure Shell, etc.) A user may enter, using user device 202, a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of one or more pages served be web server 222. In response, web server 222 may transmit a web page that is rendered on a display device of user device 202 in the network browser.

Web server 222 may enable a user to interact with one or more web applications (e.g., application logic 210) provided in a transmitted web page. A web application may provide user interface (UI) components that are rendered on a display device of a computing device. The user may interact (e.g., select, move, enter text into) with the UI components, and, based on the interaction, the web application may update one or more portions of the web page. A web application may be executed in whole, or in part, locally on a client device.

The web application may populate the UI components with data from external sources or web server in various examples. The web application may issue application programming interface (API) calls to retrieve the data. Conversely, data entered by a user into a UI component may be transmitted using an API call back to the web server.

Figure 3:
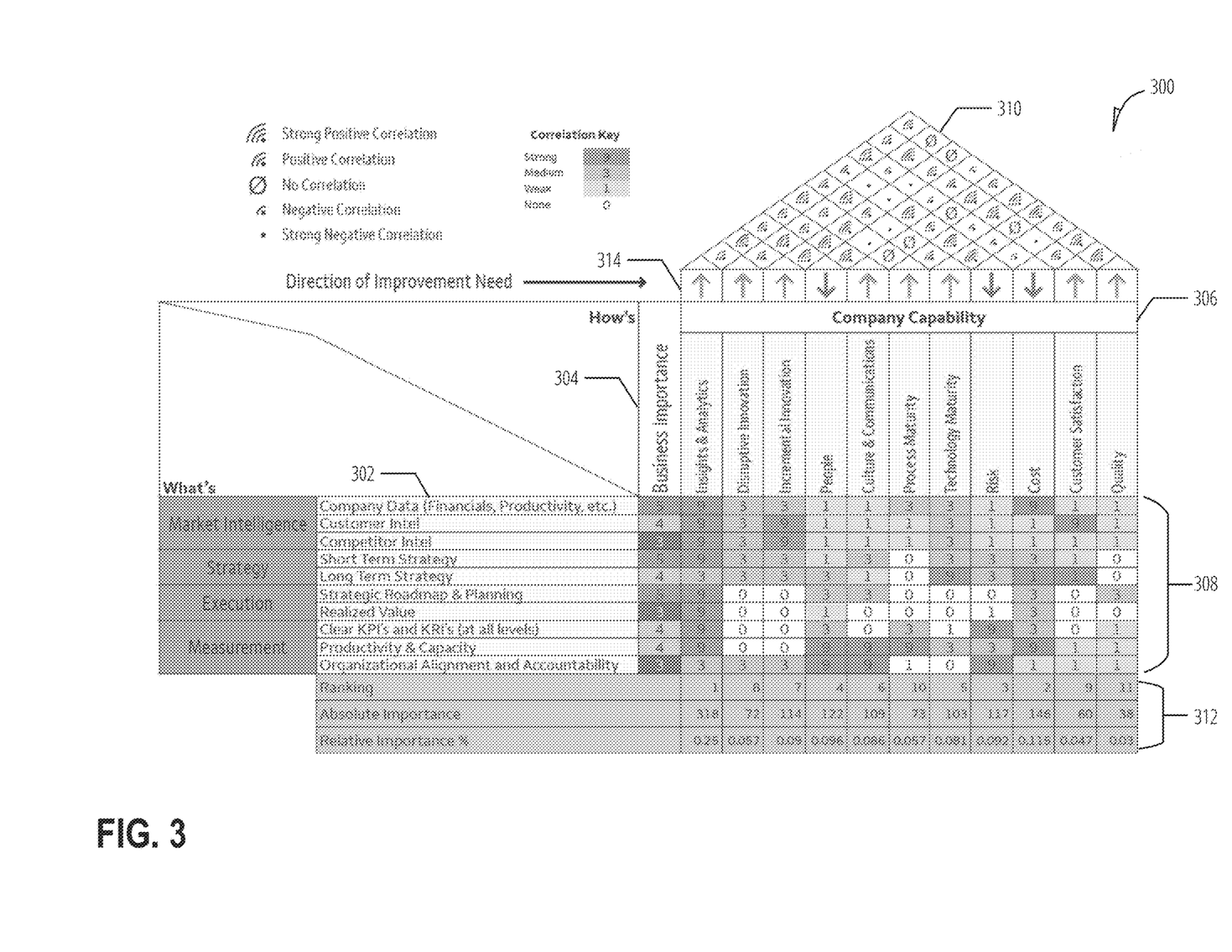
FIG. 3 is a user interface diagram of a first portion of a GUI planning tool, according to various examples.
Figure 4:
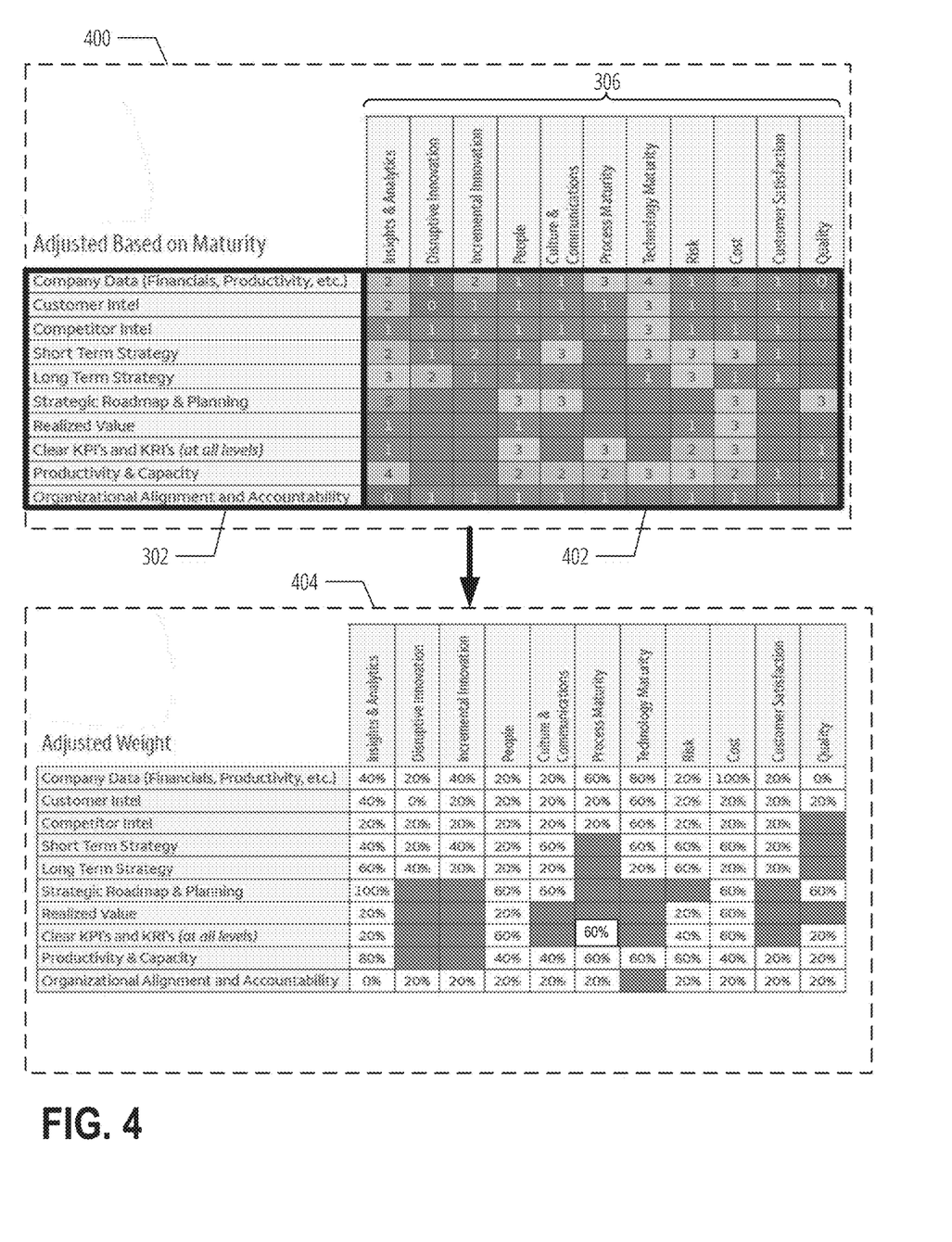
FIG. 4 is a user interface diagram of a second portion of a GUI planning tool, according to various examples

FIG. 3 is a user interface diagram of a first portion of a GUI planning tool 300, according to various examples. Different portions of GUI planning tool 300 may be presented in a variety of manners. For example, a second portion of GUI planning tool 300 (e.g., as shown in FIG. 4) may be replace the first portion upon a user activating a button UI element labeled "Next" (not shown). In another example, the second portion may be overlaid on top of the first portion. In another example, the second portion and the first portion may be displayed simultaneously (e.g., in a spreadsheet document) to allow for a user to work with multiple portions of GUI planning tool 300 at the same time.

FIG. 3 illustrates strategic driver rows 302, importance column 304, entity capability columns 306, relationship intersections 308, capability correlations 310, rankings section 312, and direction of need row 314.

Strategic driver rows 302 may be a set of characteristics (e.g., factors) of an entity that may contribute for growth. Strategic driver rows 302 may have groupings as depicted in FIG. 3 (e.g., market intelligence, strategy, execution, and measurement). More of fewer rows may be used without departing from the scope of this disclosure.

Importance column 304 may include values representing the importance of an individual strategic driver. In various examples, a value may range from one (1) to five (5) with five indicating a higher level of importance. Application logic 210 may retrieve a set of default importance values for presenting in importance column 304, in various examples. A user may use an input device (e.g., a keyboard, touchscreen) of user device 202 to edit the default value as presented in importance column 304.

In various examples, the formatting of cells in importance column 304 may be based on the values entered into the column. For example, formatting component 218 may use a color scale (e.g., a heat map) in which higher values are a first color (e.g., green) and lower values are a second color (e.g., red). Other formatting techniques may be used such as changing font, font size, font style, border color, border thickness, etc.

Entity capability columns 306 may be a set of capabilities that help an entity achieve one or more of the strategic drivers listed in strategic driver rows 302. Eleven different capabilities are depicted in FIG. 3; however, more or fewer capabilities may be used without departing from the scope of this disclosure.

Relationship intersections 308 may identify correlation values between the rows of strategic driver rows 302 and columns of entity capability columns 306. A correlation value may be based on a legend in some examples. A set of default correlation values may be retrieved from database 206 in various examples. A user may use an input device (e.g., a keyboard, touchscreen) of user device 202 to edit the default value as presented in relationship intersections 308.

Capability correlations 310 may identify the correlations between the capabilities of entity capability columns 306 as discussed previously with respect to correlations 110. The direction of symbols in direction of need row 314 may represent whether or not an entity has an increasing or decreasing need of the capability (e.g., lower cost and risk, more quality).

In various examples, the formatting of cells in relationship intersections 308 may be based on the values entered into the intersecting cells. For example, formatting component 218 may use a color scale (e.g., a heat map) in which higher values are a first shade of a color (e.g., dark green) and lower values are a second shade of the color (e.g., light green). Other formatting techniques may be used such as changing font, font size, font style, border color, border thickness, etc.

Rankings section 312 may include one or more rows based on the data present in relationship intersections 308. As illustrated in FIG. 3, there are three rows in rankings section 312. The first row "Ranking" is based on the values calculated in the second row, "Absolute Importance." In various examples, the calculations described with respect to rankings section 312 may be performed by ranking component 216 without user intervention.

The values in the "Absolute Importance" row may be the sum of each cell in its column—excluding the values in rankings section 312—multiplied by the its corresponding value in importance column 304. For example, the "Insight and Analytics" capability cells have a total value of 318 based on the summing of 5*9+4*9, etc. The "Ranking" row may be a value of 1 to 11—or other number if there are more or fewer capabilities—based on the relative order of the values in the "Absolute Importance" row. The values in the "Relative Importance" row may be a percentage value that is calculated based on the column's "Absolute Importance" value divided by the sum of all the values in the "Absolute Importance" row. Thus, 318/1241 is equal to 0.25.

FIG. 4 is a user interface diagram of a second portion of a GUI planning tool, according to various examples. The GUI planning tool may be the same GUI planning tool as illustrated in FIG. 3. As indicated previously, this second portion may be presented after the user interface diagram in FIG. 3.

User interface diagram 400 includes strategic driver rows 302, entity capability columns 306, and maturity relationships 402. A user may use user device 202 to update the values in maturity relationships 402 to reflect the entity's maturity at a particular intersection. For example, a user may input a "5" at the intersection of "company data" and "cost." Maturity relationships 402 uses a 0-5 scale, but other scales may be used. A '5' may mean mastery/optimized, a '4' expert/managed, a '3' proficient/defined, a '2' competent/repeatable, a '1' novice/initial, and a '0' inexperienced.

A legend may be presented to assist the user in determining the correct maturity level. Additionally, definitions 208 may store definitional entries for each capability and at each possible level of maturity. Accordingly, a user may be able access what may be considered a '2' rating for the intersection of "short term strategy" and "risk" and perform a self-assessment of whether their entity meets that definition.

Definitions 208 may be created to reduce ambiguity of what level of maturity an entity falls into, which in turn results in more accurate information for ultimately determining where to allocate resources. For example, a level 3 "Technology" maturity definition may include "Tools supporting core operational processes are deployed" and "Work is underway to rationalize common tools."

A definition may be presented when a user hovers (e.g., does not move a cursor for a threshold amount of time) over an intersection. For example, when a user places their cursor over the intersection of "short term strategy" and "risk," the stored maturity definitions for risk may be presented. In other examples, definitions 208 may be accessed as a standalone document (e.g., via a separate webpage, a download, activating a menu item, etc.).

In various examples, maturity component 214 may use the values of maturity relationships 402 to create a weighted matrix of values 404 that looks at the entered maturity values compared to the maximum possible value. In the illustrated example, a '5' is the highest maturity value, and, thus, the weighted value would be a '1.' A '3' maturity value would be 60% of the maximum value, and, thus, the weight value would be 0.6. In various examples, the weighted matrix is not presented to the user.

Figure 5:
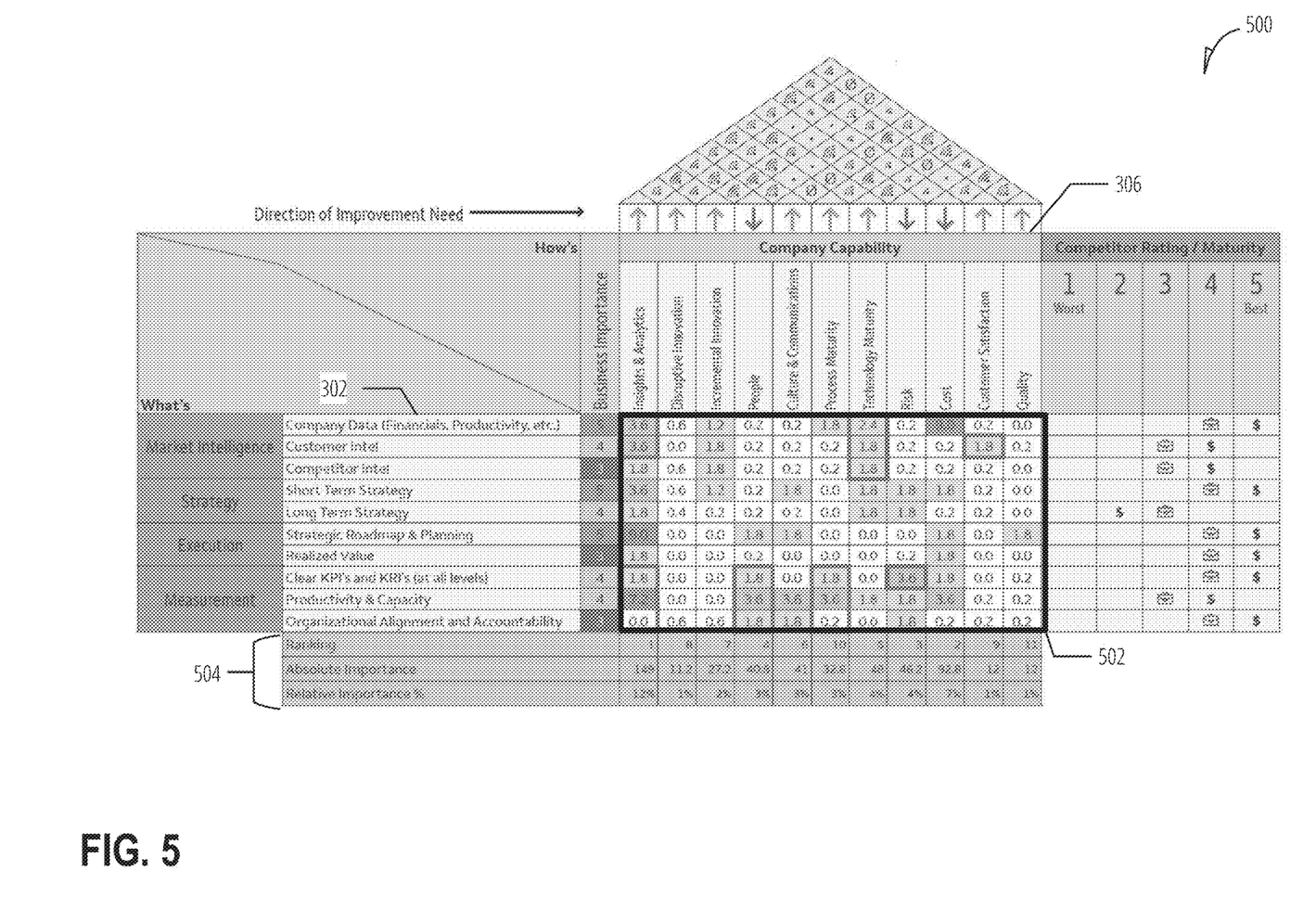
FIG. 5 is a user interface diagram of a third portion of a GUI planning tool, according to various examples.

FIG. 5 is a user interface diagram 500 of third portion of a GUI planning tool, according to various examples. User interface diagram 500 includes strategic driver rows 302, entity capability columns 306, adjusted relationship intersections 502, capability correlations 310, and updated ranking section 504.

Adjusted relationship intersections 502 may be calculated based on the cell's value in relationship intersections 308 and the corresponding value in the weighted matrix of values discussed above. The values may be calculated without human intervention. For example, the value at the intersection of "company data" and "insights and analytics" in FIG. 3 is '9' and the value in the weighted matrix is 0.4. Accordingly, the cell's value in adjusted relationship intersections 502 is 3.6.

Adjusted relationship intersections 502 may be formatted in a variety of manners. For example, formatting component 218 may use a color scale (e.g., a heat map) in which higher values are a first shade of a color (e.g., dark green) and lower values are a second shade of the color (e.g., light green).

Formatting component 218 may use a second formatting technique to highlight the areas that present the greatest opportunity for allocating resources. The value alone may not determine what areas to invest in. For example, both the "long term strategy" cell and the "competitor intel" cell in the "insights and analytics" column have a value of 1.8. The delta between these cells and their respective cells in relationship intersections 308, however, is different. The "long term strategy" and "insights and analytics" intersection has a maximum value of '3' based on its value FIG. 3 leaving a delta of 1.2. In contrast, the "competitor intel" and "insights and analytics" had an original value of '9'—leaving a delta of 7.2. In various examples, a threshold delta is used to determine which cells to highlight (e.g., change background color, thicken borders, etc.).

In various examples, updated ranking section 504 may present newly calculated ranking values based on the changes in adjusted relationship intersections 502 without additional human input. The calculation may be the same as described with respect to FIG. 3. Accordingly, the absolute importance value is based on the sum of each cell in its column multiplied by its corresponding value in the business importance column.

Over a period of time, a user may revisit the GUI planning tool to determine where to invest resources next. For example, every three months a user may update the maturity relationships 402 based on recent improvements. This, in turn, may automatically update adjusted relationship intersections 502 and updated ranking section 504.

Figure 6:
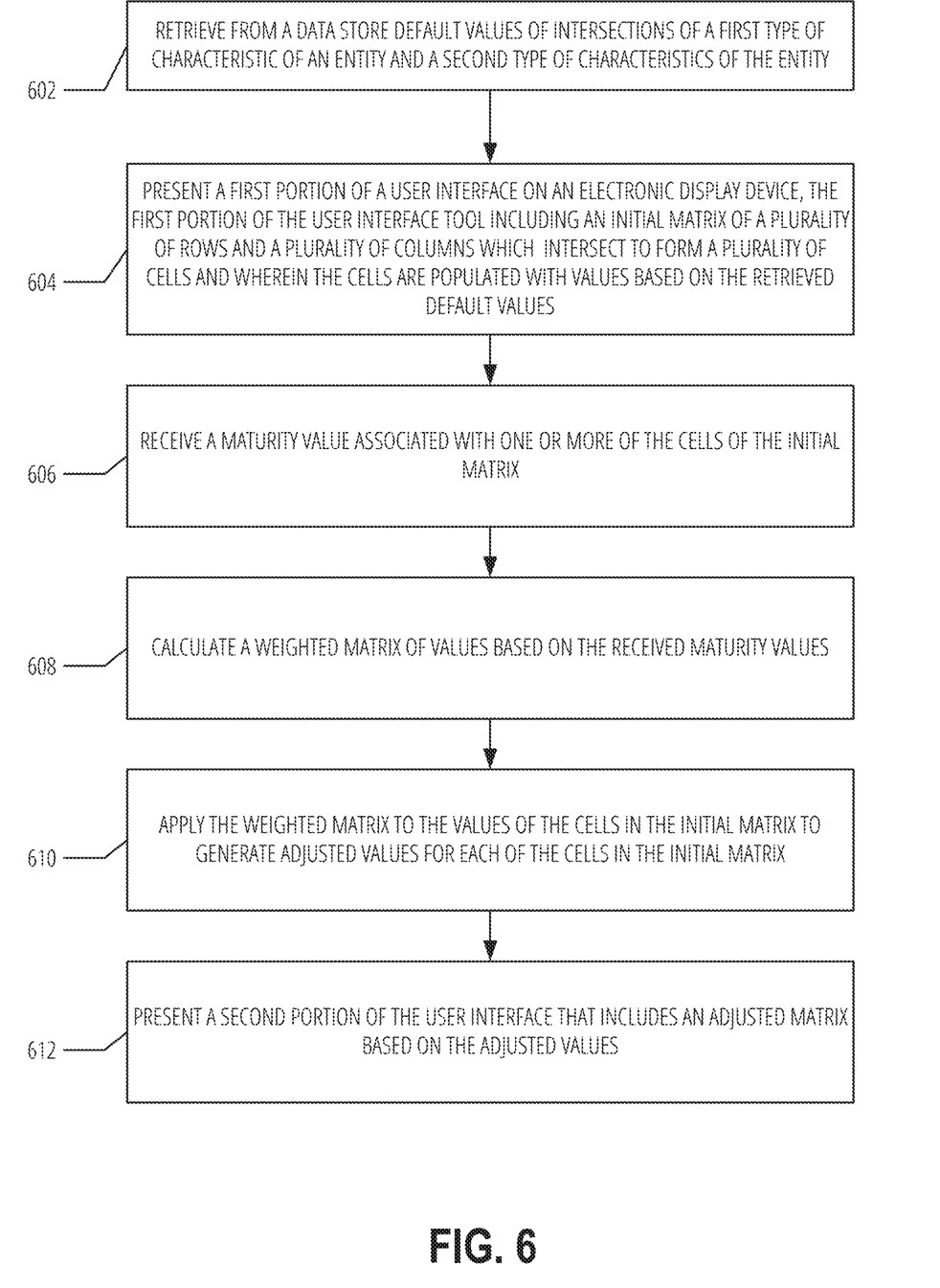
FIG. 6 is a flowchart illustrating a method to present a user interface, according to various examples.

FIG. 6 is a flowchart illustrating a method to present a user interface, according to various examples. The method is represented as a set of blocks that describe operations 602-612 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

Operation 602, in various examples, includes retrieving from a data store default values of intersections of a first type of characteristic of an entity and a second type of characteristics of the entity. A hardware processing device (e.g., a computing device) may be used to retrieve the default values. An intersection may be a possible combination of a first characteristic and a second characteristic. For example, the first type of characteristic may be strategic drivers and the second type of characteristic may be company capabilities. Accordingly, there may be a default value for each combination (e.g., intersection) of strategic driver and company capability.

Operation 604, in various examples, includes presenting a first portion of a user interface on an electronic display device, the first portion of the user interface tool including an initial matrix of a plurality of rows and a plurality of columns. The plurality of rows and columns may intersect to form a plurality of cells wherein the cells are populated with values based on the retrieved default values. In various examples, each row is associated with a different characteristic of the first type of characteristic of the entity and each column is associated with a different characteristic of the second type of characteristic of the entity. As an example, relationship intersections 308 of FIG. 3 may be the initial matrix.

In various examples, the hardware processing device is used for the presenting. Presenting may include transmitting data from a web server for rendering on the display device. Presenting may include updating a window of an application executing on the hardware processing device.

In various examples, the cells in the initial matrix may be formatted according to their values. For example, heat map formatting may be applied. Heat map formatting may include using a single color but differing the shades of the color based on the value (e.g., darker green for higher values, light green for lower values) or different colors for different value ranges.

Operation 606, in various examples, includes receiving a maturity value associated with one or more of the cells of the initial matrix. A maturity value may be a numerical rating with how mature—given a definition—an entity is with respect to a company capability as applied to a strategic driver. The values may be received from a third portion of the user interface. The third portion may be presented at the same time as the first portion in various examples (e.g., a single spreadsheet). In other examples, an application may present the different portions of the user interface in response to selecting UI elements (e.g., a button, menu) that are configured to allow a user to navigate between the various portions of the user interface.

The third portion of the user interface may include: a plurality of rows, each row associated with a different characteristic of the first type of characteristic of the entity according to the plurality of rows in the initial matrix; and a plurality of columns, each column associated with a different characteristic of the second type of characteristic of the entity according to the plurality of columns in the initial matrix. For example, the third portion may look like user interface diagram 400 in FIG. 4. The plurality of rows and columns of the third portion of the user interface may be configured (e.g., may receive user input) to receive the maturity value associated with one or more of the cells of the initial matrix.

In various examples, an input may be received associated with a location on the third portion of the user interface. Based on the location, a characteristic of the second type of characteristic of the entity may be identified. A definition of a maturity level for the identified characteristic may be retrieved and presented in the third portion of the user interface. For example, the input may be based receiving a hover over input and wherein the location is a label of the identified characteristic.

Consider user interface 400 in FIG. 4. A user may place a cursor over the "Technology Maturity" label. In response, a stored definition of what the maturity levels means for "Technology Maturity" may be retrieved from a data store and presented. Presenting may include a pop-up window at the location of the cursor in various examples.

In various examples, the location of the cursor may be over a particular cell. In these instances, the presented definition may be based on the column and the current value of the cell. For example, if the cell has a value of '2' in the "Technology Maturity" column, the definition of a level 2 maturity for "Technology Maturity" may be presented.

Operation 608, in various examples, includes calculating a weighted matrix of values based on the received maturity values (e.g., such as weighted matrix of values 404). For example, a value in the weighted matrix may be based on the product of the scaled value (e.g., 0-1) of the maturity level presented in the third portion of the user interface and the value of the cell in the initial matrix.

Operation 610 in various examples, includes applying the weighted matrix to the values of the cells in the initial matrix to generate adjusted values for each of the cells in the initial matrix. In various examples, the hardware processing device performs operation 610. Applying may include multiplying the value of a cell in the weighted matrix to its corresponding value in the initial matrix. Operation 610 does not require that a value in the initial matrix be changed. For example, if the value in the weighted matrix was '1' then the adjusted value would be the same as the value from the initial matrix.

Operation 612, in various examples, includes presenting a second portion of the user interface that includes an adjusted matrix based on the adjusted values. The label of "second portion" may not imply that the second portion is presented before the third portion. As detailed above, the second portion is based on values from the third portion, and thus, the second portion would generally appear last. In various embodiment, the first, second, and third portions of the user interface are displayed simultaneously. The adjusted matrix may be a matrix such as adjusted relationship intersections 502 in FIG. 5.

In various examples, another operation may include determining that a value of a cell in the adjusted matrix is greater than a threshold amount different than the cell's respective value in the initial matrix. For example, the threshold may be 4, and a formatting adjustment may be applied to the cell in the adjusted matrix based on the determining. The formatting adjustment may include emphasizing the cell (e.g., by bolding the value, thickening a border, etc.)

In various examples, another operation may include receiving an updated value in a cell of the initial matrix, Then, a cell in the adjusted matrix may be automatically updated based on the updated value. For example, the calculation in operation 610 may be repeated with the updated value to generate a new adjusted value for the associated cell in the adjusted matrix.

In various examples, another operation may include receiving an updated maturity value associated with the one or more of the cells of the initial matrix. Then, a cell in the adjusted matrix may be automatically updated based on the updated value. For example, the calculation in operation 610 may be repeated with the updated maturity value to generate a new adjusted value for the associated cell in the adjusted matrix.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
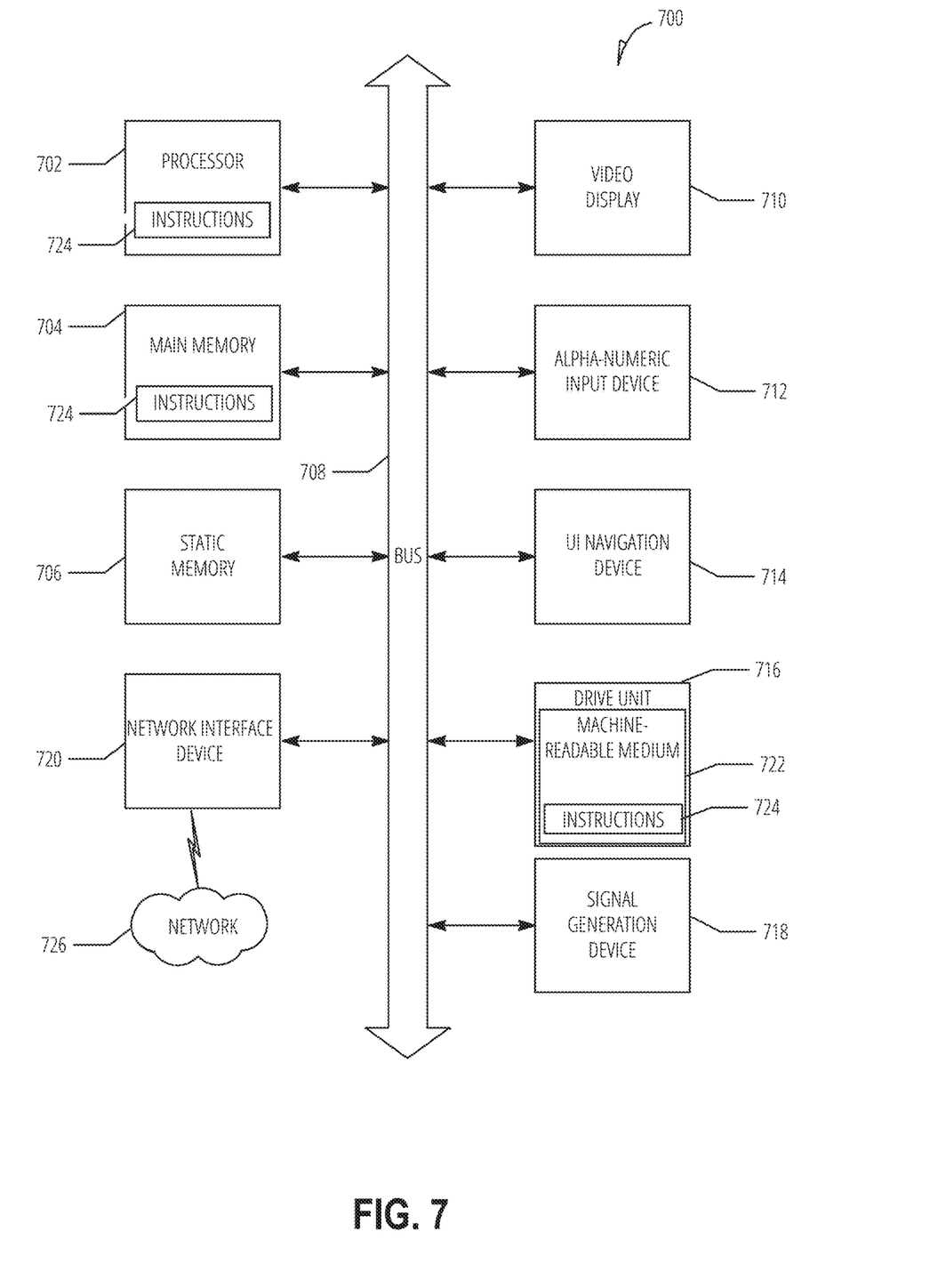
FIG. 7 is a block diagram illustrating an example machine upon which any one or more of the techniques (e.g., methodologies) discussed herein may be performed, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A, 5G, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
retrieving from a data store, using a hardware processing device, default values of intersections of a first type of characteristic of an entity and a second type of characteristics of the entity;
presenting, using the hardware processing device, a first portion of a user interface on an electronic display device, the first portion of the user interface including an initial matrix of:
a plurality of rows associated with a different characteristic of the first type of characteristic of the entity;
a plurality of columns associated with a different characteristic of the second type of characteristic of the entity, the plurality of columns including capability values and first importance values; and
wherein, the plurality of rows and plurality of columns intersect to form a plurality of cells and wherein the cells are populated with values based on the retrieved default values, the plurality of cells including relationship intersections having values;
presenting a ranking section at the user interface first portion, the ranking section having:
second importance values that are a function of the values of the relationship intersections where the relationship values are a function of the capability values and the first importance values;
a ranking portion that is a function of the importance values; and
a relative importance percentage that is a function of the second importance value;
receiving a maturity value associated with one or more of the cells of the initial matrix;
calculating a weighted matrix of values based on the received maturity values;
applying the weighted matrix to the values of the cells in the initial matrix to generate adjusted values for the cells in the initial matrix;
presenting a second portion of the user interface that includes an adjusted matrix based on the adjusted values;
presenting a third portion of the user interface;
receiving a hover over input associated with a location on the third portion of the user interface;
presenting, in a pop-window, information associated with the location in response to the hover over input;
determining that a value of a cell in the adjusted matrix is greater than a threshold amount different than the cell's respective initial value in the initial matrix; and
highlighting the cell in the adjusted matrix with a formatting adjustment to the cell in the adjusted matrix based on determining that the value of the cell in the adjusted matrix is greater than the threshold amount.

2. The method of claim 1, wherein the third portion of the user interface includes:
a plurality of rows, each row associated with a different characteristic of the first type of characteristic of the entity according to the plurality of rows in the initial matrix; and
a plurality of columns, each column associated with a different characteristic of the second type of characteristic of the entity according to the plurality of columns in the initial matrix, wherein the plurality rows and columns of the third portion of the user interface are configured to receive the maturity value associated with one or more of the cells of the initial matrix.

3. The method of claim 2, further comprising:
based on the location, identifying a characteristic of the second type of characteristic of the entity;
retrieving a definition of a maturity level for the identified characteristic; and
presenting the retrieved definition of the maturity level for the identified characteristic in the third portion of the user interface.

4. The method of claim 3, wherein the location is a label of the identified characteristic.

5. The method of claim 1, further comprising applying heat map formatting to the cells in the initial matrix based on the values in the initial matrix.

6. The method of claim 1, further comprising:
receiving an updated value in a cell of the initial matrix; and
automatically updating a cell in the adjusted matrix based on the updated value.

7. The method of claim 1, further comprising:
receiving an updated maturity value associated with the one or more of the cells of the initial matrix; and
automatically updating a cell in the adjusted matrix based on the updated maturity value.

8. A computing apparatus, the computing apparatus comprising:
a processor; and
a memory storing instructions that, when executed by the processor, configure the apparatus to:
retrieve from a data store default values of intersections of a first type of characteristic of an entity and a second type of characteristics of the entity;
present, a first portion of a user interface on an electronic display device, the first portion of the user interface including an initial matrix of:
a plurality of rows associated with a different characteristic of the first type of characteristic of the entity;
a plurality of columns associated with a different characteristic of the second type of characteristic of the entity, the plurality of columns including capability values and first importance values; and
wherein, the plurality of rows and plurality of columns intersect to form a plurality of cells and wherein the cells are populated with values based on the retrieved default values, the plurality of cells including relationship intersections having values;
present a ranking section at the user interface first portion, the ranking section having:
second importance values that are a function of the values of the relationship intersections where the relationship values are a function of the capability values and the first importance values;
a ranking portion that is a function of the importance values; and
a relative importance percentage that is a function of the second importance value:
receive a maturity value associated with one or more of the cells of the initial matrix;
calculate a weighted matrix of values based on the received maturity values;
apply the weighted matrix to the values of the cells in the initial matrix to generate adjusted values for the cells in the initial matrix;
present a second portion of the user interface that includes an adjusted matrix based on the adjusted values;
present a third portion of the user interface;
receive a hover over input associated with a location on the third portion of the user interface;
present, in a pop-window, information associated with the location in response to the hover over input;
determine that a value of a cell in the adjusted matrix is greater than a threshold amount different than the cell's respective initial value in the initial matrix; and
highlight the cell in the adjusted matrix with a formatting adjustment to the cell in the adjusted matrix based on determining that the value of the cell in the adjusted matrix is greater than the threshold amount.

9. The computing apparatus of claim 8, wherein the third portion of the user interface includes:
a plurality of rows, each row associated with a different characteristic of the first type of characteristic of the entity according to the plurality of rows in the initial matrix; and
a plurality of columns, each column associated with a different characteristic of the second type of characteristic of the entity according to the plurality of columns in the initial matrix, wherein the plurality rows and columns of the third portion of the user interface are configured to receive the maturity value associated with one or more of the cells of the initial matrix.

10. The computing apparatus of claim 9, wherein the instructions further configure the apparatus to:

based on the location, identify a characteristic of the second type of characteristic of the entity;
retrieve a definition of a maturity level for the identified characteristic; and
present the retrieved definition of the maturity level for the identified characteristic in the third portion of the user interface.

11. The computing apparatus of claim 10, wherein the location is a label of the identified characteristic.

12. The computing apparatus of claim 8, wherein the instructions further configure the apparatus to apply heat map formatting to the cells in the initial matrix based on the values in the initial matrix.

13. The computing apparatus of claim 8, wherein the instructions further configure the apparatus to:
receive an updated value in a cell of the initial matrix; and
automatically update a cell in the adjusted matrix based on the updated value.

14. The computing apparatus of claim 8, wherein the instructions further configure the apparatus to:
receive an updated maturity value associated with the one or more of the cells of the initial matrix; and
automatically update a cell in the adjusted matrix based on the updated maturity value.

15. A non-transitory computer-readable storage medium, the computer-readable storage medium including instructions that when executed by a computer, cause the computer to:
retrieve, from a data store, default values of intersections of a first type of characteristic of an entity and a second type of characteristics of the entity;
present a first portion of a user interface on an electronic display device, the first portion of the user interface including an initial matrix of:
a plurality of rows, each row associated with a different characteristic of the first type of characteristic of the entity;
a plurality of columns, each column associated with a different characteristic of the second type of characteristic of the entity, the plurality of columns including capability values and first importance values; and
wherein, the plurality of rows and plurality of columns intersect to form a plurality of cells and wherein the cells are populated with values based on the retrieved default values, the plurality of cells including relationship intersections having values;
present a ranking section at the user interface first portion, the ranking section having:
second importance values that are a function of the values of the relationship intersections where the relationship values are a function of the capability values and the first importance values;
a ranking portion that is a function of the importance values; and
a relative importance percentage that is a function of the second importance value;
receive a maturity value associated with one or more of the cells of the initial matrix;
calculate a weighted matrix of values based on the received maturity values;
apply the weighted matrix to the values of the cells in the initial matrix to generate adjusted values for each of the cells in the initial matrix; and
present a second portion of the user interface that includes an adjusted matrix based on the adjusted values;
present a third portion of the user interface;
receive a hover over input associated with a location on the third portion of the user interface;
present, in a pop-window, information associated with the location in response to the hover over input;
determine that a value of a cell in the adjusted matrix is greater than a threshold amount different than the cell's respective initial value in the initial matrix; and
highlight the cell in the adjusted matrix with a formatting adjustment to the cell in the adjusted matrix based on determining that the value of the cell in the adjusted matrix is greater than the threshold amount.

16. The computer-readable storage medium of claim 15, wherein the third portion of the user interface includes:
a plurality of rows, each row associated with a different characteristic of the first type of characteristic of the entity according to the plurality of rows in the initial matrix; and
a plurality of columns, each column associated with a different characteristic of the second type of characteristic of the entity according to the plurality of columns in the initial matrix, wherein the plurality rows and columns of the third portion of the user interface are configured to receive the maturity value associated with one or more of the cells of the initial matrix.

17. The computer-readable storage medium of claim 16, wherein the instructions further configure the computer to:
based on the location, identify a characteristic of the second type of characteristic of the entity;
retrieve a definition of a maturity level for the identified characteristic; and
present the retrieved definition of the maturity level for the identified characteristic in the third portion of the user interface.

* * * * *

UNITED STATES PATENT AND TRADEMARK OFFICE
CERTIFICATE OF CORRECTION

| | |
|---|---|
| PATENT NO. | : 11,488,080 B1 |
| APPLICATION NO. | : 16/721859 |
| DATED | : November 1, 2022 |
| INVENTOR(S) | : Simms et al. |

It is certified that error appears in the above-identified patent and that said Letters Patent is hereby corrected as shown below:

In the Claims

In Column 14, Line 30, in Claim 8, delete "value:" and insert --value;-- therefor Signed and Sealed this
Twentieth Day of December, 2022

Katherine Kelly Vidal
*Director of the United States Patent and Trademark Office*